May 24, 1966 E. C. CORNISH 3,253,165

CURRENT STEERING LOGIC CIRCUIT EMPLOYING NEGATIVE RESISTANCE DEVICES IN THE OUTPUT NETWORKS OF THE AMPLIFYING DEVICES

Filed Dec. 23, 1963 2 Sheets-Sheet 1

INVENTOR.
ELDON C. CORNISH
BY John V. Regan
ATTORNEY

INVENTOR.
ELDON C. CORNISH
BY John V. Regan
ATTORNEY

United States Patent Office 3,253,165

Patented May 24, 1966

3,253,165

CURRENT STEERING LOGIC CIRCUIT EMPLOYING NEGATIVE RESISTANCE DEVICES IN THE OUTPUT NETWORKS OF THE AMPLIFYING DEVICES

Eldon C. Cornish, Pennsauken, N.J., assignor to Radio Corporation of America, a corporation of Delaware Filed Dec. 23, 1963, Ser. No. 332,498
8 Claims. (Cl. 307—88.5)

This invention relates to electrical circuits and, in particular, to improved switching circuits.

Most transistor switching circuits of the prior art are characterized by large signal, nonlinear operation of the transistor, in which the transistor is driven between cutoff and saturation. One reason for operating the transistor in this manner is to assure that the output voltage of the transistor has one or the other of two distinct values, depending upon the input, and is independent of the circuit's loading. However, operating a transistor in deep saturation has the effect of increasing the turn-off time of the transistor. The turn-on time also may be increased. In any event, operating the transistor in saturation results in a decrease in the switching speed and the maximum pulse rate.

It has been suggested that transistor saturation may be avoided by using a so-called "current steering" circuit arrangement in which a substantially constant current is steered selectively into either a first or a second transistor. In such an arrangement, however, the output voltages are sensitive to the loading on the circuit. Also, the general type of current steering circuit does not have the storage capability which is necessary, for example, in flip-flops, gated retimers, and the like.

It is one object of this invention to provide an improved switching circuit in which the aforementioned problems of saturation are avoided.

It is another object of the invention to provide an improved flip-flop circuit.

It is still another object of this invention to provide an improved triggerable flip-flop.

It is a further object of this invention to provide improved circuits that have the characteristics aforementioned and that may be switched at high speed.

Briefly stated, the invention includes a pair of amplifying devices each having input and output electrodes defining a current carrying path, and a control electrode. Each current carrying path is connected in series with a different negative resistance device, such as a tunnel diode, and a source of substantially constant current which is common to the two current paths. The constant current has a value that is greater in magnitude than the peak current of either negative resistance device. Steering of the constant current is accomplished by controlling the voltages at the control electrode of at least one of the amplifying devices.

In the accompanying drawing, like reference characters denotes like components, and:

Figures 1, 2, 3:
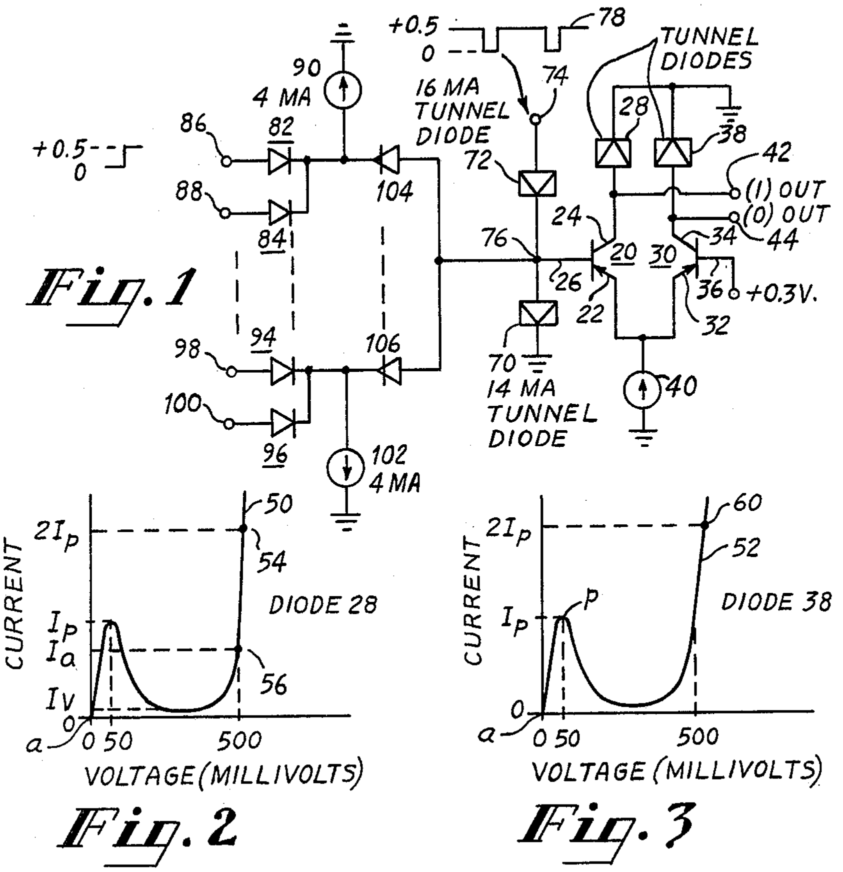
FIGURE 1 is a schematic diagram of a switching circuit according to the invention, and circuitry for controlling the switching operation.
FIGURES 2 and 3 are tunnel diode operating characteristics useful in describing the operation of the circuit of FIGURE 1.

In the embodiment of FIGURE 1, a pair of transistors 20, 30 have their input, or emitter electrodes 22, 32 respectively, connected to one terminal of a source 40 of substantially constant current. The other terminal of source 40 is connected to a point of reference potential, indicated by the conventional symbol for circuit ground. The collector electrodes 24, 34, which serve as output electrodes for the transistors 20, 30 are connected by way of separate negative resistance devices 28, 38, respectively, to ground. These negative resistance devices 28, 38, which preferably are tunnel diodes, are ones that have a volt-ampere characteristic characterized by first and second regions of positive resistance at relatively low and relatively high values of voltage, respectively, and a region of negative resistance joining the two regions of positive resistance. Output terminals 42, 44 are connected at the collector electrodes 24, 34, respectively.

The base electrode 36, or control electrode, of the second transistor 30 is connected to a point of fixed potential of +0.3 volt. The voltage at the base electrode 26 of first transistor 20 is controlled, in a manner to be described, to have either a first value more positive than +0.3 volt or a second value that is less positive than +0.3 volt. When the base voltage 26 is less positive than +0.3 volt, all of the current from the current supply means 40 is steered through the current carrying path defined by emitter 22 and collector 24. The collector 24 current may now, in part, through the tunnel diode 28 to ground and, in part, to any load connected at the output terminal 42. The particular division of collector 24 current is a function of the loading at the output terminal 42. The current source 40 is chosen to supply a value I of current which is greater than the peak current $I_p$ of either of the tunnel diodes 28, 38, whereby the tunnel diode 28 is switched to a high voltage stable state. No current flows through the emitter 32-collector 34 path of second transistor 30 and through the other tunnel diode 38 under these conditions, neglecting transistor leakage current.

The function and operation of the tunnel diodes 28, 38 may best be seen by referring to FIGURES 2 and 3. FIGURE 2 is a volt-ampere operating characteristic for the tunnel diode 28, and FIGURE 3 is a volt-ampere operating characteristic for the tunnel diode 38. It is assumed that the diodes 28 and 38 are substantially the same and, for this reason the volt-ampere characteristics 50 and 52 in FIGURES 2 and 3, respectively, are shown as being identical. In actual practice, the operating characteristics 50 and 52 may not be exactly the same but, as will be clear from the following discussion, these devices 28 and 38 may have very loose tolerances without affecting the circuit operation. What is important is that the peak currents $I_p$ be fairly close to each other in value, and that the voltages across the devices be substantially the same for the high voltage operating condition.

Assuming that the current source 40 supplies a current $I=2I_p$, and that the voltage at base electrode 26 is less positive than +0.3 volt, as previously discussed, all of the current $2I_p$ flows into the emitter 22 of the first transistor 20. Neglecting the small base 26 current and any loading at the output terminal 42, the constant current $2I_p$ flows through the tunnel diode 28 to ground. The operating point on the characteristic 50 of FIGURE 2 then is given by the point 54, corresponding to a voltage across the tunnel diode 28 of approximately 0.5 volt. Once the tunnel diode 28 has switched to the high voltage stable state, a large portion of the current $2I_p$ may be diverted to the load (not shown) connected at output terminal 42, without any substantial change in the voltage across the tunnel diode 28, provided only that the diode 28 current is not reduced below the value of valley current $I_v$. For example, a current $2I_p—I_a$ may be diverted to the output terminal 42. The current through the diode 28 then has a value $I_a$ in the steady state, and the operating point on the characteristic 50 is the point 56. As may be seen in FIGURE 2, the voltage across the diode 28 is approximately 0.5 volt for this condition also. It is thus seen that the output voltage at the terminal 42 is quite insensitive to the circuit loading, which is a characteristic especially desired in digital computer circuitry.

For the conditions given above, second transistor 30 is nonconducting and no current flows through that transistor (neglecting leakage current). Also, no current from the source 40 is supplied to the tunnel diode 38, whereby diode 38 is biased at the origin *a* in FIGURE 3. The voltage across the diode 38 then is zero volts, as is the output voltage at terminal 44. If any small current should flow through diode 38 to the load connected at the output terminal 44, the output voltage may vary a few millivolts as the operating point on the characteristic 52 moves along the path *ap*, but this voltage variation is so small that it may be neglected for practical purposes.

If the voltage at the base electrode 26 is more positive than +0.3 volt, all of the current from source 40 is steered through the second transistor 30 to the tunnel diode 38, and switches the diode 38 to the high voltage state. The operating point for diode 38 then may be the point 60 on the characteristic 52 of FIGURE 3, and the voltage at output terminal 44 is +0.5 volt. No current flows through the first transistor 20 under these conditions and the tunnel diode 28 is biased at the origin *a* (FIGURE 2). It is thus seen from the aforementioned discussion that the current from source 40 may be selectively steered through one or the other of the transistors 20, 30 and the respective tunnel diodes 28, 38, whereby the output voltage at one of the terminals 42 and 44 is at +0.5 volt while the voltage at the other terminal concurrently is at zero. This complementary output feature renders the circuit well-suited for use as a flip-flop, storage device and the like for digital computer applications. Also, the output capacitance need be charged or discharged over only a 0.5 volt range when the circuit is switched, whereby very fast changes in output voltage are possible.

One manner in which the current steering may be effected will now be described. A pair of tunnel diodes 70, 72 is connected in series between circuit ground and a terminal 74, with the junction 76 of the diodes connected directly to the base electrode 26. The tunnel diodes 70 and 72 form what is known in the art as a "tunnel diode unbalanced pair." As is known, a tunnel diode unbalanced pair may be energized in such a manner that one of the tunnel diodes is biased in the high voltage, stable state while the other tunnel diode is biased in the low voltage, stable state. Which one of the diodes 70, 72 is biased in the high voltage region is determined by the inputs applied at junction 76 when the unbalanced pair is energized. Clock signals 78 are applied across the unbalanced pair, between terminal 74 and circuit ground, to energize the pair. These clock signals may vary between about +0.5 volt and ground, and are of a value to bias one only of the tunnel diodes 70, 72 in the high voltage state.

The input circuitry comprises a number of diode OR gates (two shown) feeding a tunnel rectifier AND gate, the output of the AND gate being connected at the junction 76. One OR gate comprises diodes 82, 84 having their anodes connected to input terminals 86, 88, respectively, and having their cathodes connected in common to the ungrounded terminal of a constant current means 90. A second OR gate comprises diodes 94 and 96 having their anodes connected to input terminals 98 and 100, respectively, and having their cathodes connected in common to the ungrounded terminal of a second constant current means 102. The AND gate comprises a number of tunnel rectifiers, each tunnel rectifier being connected between the junction point 76 and the ungrounded terminal of a different current means. Tunnel rectifier 104, for example, has its "cathode" connected to the current means 90 and its "anode" connected to the junction 76.

By way of example, tunnel diode 70 may have a peak current of 14 milliamperes and tunnel diode 72 a peak current of 16 milliamperes. Assume that each of the constant current means 90 and 102 may take four milliamperes. Diodes 82, 84, 94 and 96 may be point contact diodes having a forward voltage drop of about 350 millivolts at four milliamperes of current. Tunnel rectifiers 104 and 106 may have a forward voltage drop of about 70 millivolts at four milliamperes of current. Current supplied to the current means 90, for example, is supplied either through the tunnel rectifier 104 or through one or both of the input diodes 82, 84. In like manner, the four milliamperes of current for the current means 102 flows either through the tunnel rectifier 106 or through one or both of the input diodes 94, 96.

Consider now the operation of the overall circuit of FIGURE 1 and assume that, at time $T_a$ (FIGURE 4), the clock voltage is +0.5 volt, tunnel diode 70 is in the low voltage state and tunnel diode 72 is in the high voltage state. The voltage at base electrode 26 is close to ground potential and first transistor 20 is in the "on" condition and receives all of the current from source 40. Tunnel diode 28 is then in the high voltage state and the (1) output voltage is at +0.5 volt. The (0) output voltage is at ground potential because second transistor 30 is not conducting. The transistor pair may be considered to be in the "reset" condition when first transistor 20 is conducting.

Figure 4:
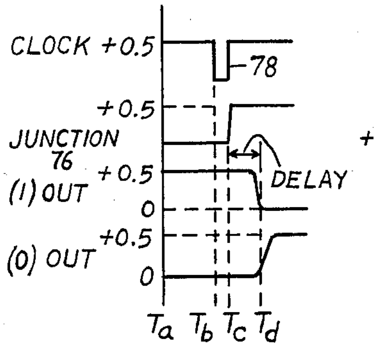
FIGURE 4 is a set of waveforms of voltages appearing at selected points in the FIGURE 1 circuit.

The clock voltage at terminal 74 falls to zero at time $T_b$. There is then no voltage across the tunnel diodes 70, 72 and both of these diodes are in the low voltage state. No change occurs in the output voltages at $T_b$ because the base 26 voltage remains close to ground potential (FIGURE 4).

Let it be assumed that at least one input to each of the diode OR gates is at +0.5 volt. For example, the input voltages at terminals 86 and 98 may be at +0.5 volt. Each of the diodes 82, 94 is forward biased and supplies four milliamperes of current to its associated current means 90, 102, respectively, and both of the tunnel rectifiers 104, 106 are reverse biased. When the clock voltage rises to +0.5 volt at $T_c$ (FIGURE 4), current flows through the tunnel diodes 70 and 72. The same current flows through both of these diodes since the tunnel rectifiers 104, 106 are reverse biased. Tunnel diode 70 switches to the high voltage state because its peak current is two milliamperes less than the peak current of the other tunnel diode 72. The voltage at base electrode 26 rises to approximately +0.5 volt after tunnel diode 70 switches. The base 26 voltage then is more positive than the voltage at base electrode 36, whereby first transistor 20 turns off and all of the current from source 40 is steered through second transistor 30.

Tunnel diode 38 switches to the high voltage state when second transistor 30 turns on, and the voltage at the (0) output terminal 44 rises to +0.5 volt. Tunnel diode 28, on the other hand, switches back to the low voltage state when the collector current in first transistor 20 falls to a low value ($<I_v$). The voltage at the (1) output terminal 42 falls to ground potential when the tunnel diode 28 switches to the low voltage state. As may be seen in FIGURE 4, the (0) and (1) output voltages do not change immediately upon the switching of the input tunnel diode 70. Instead, there is a delay which is occasioned by the turn-off delay time of the transistor 20 and the turn-on delay time of the second transistor 30.

Advantage may be taken of this switching delay in the transistors 20, 30, when the circuit is used as one stage of a shift register, counter or the like, in the following manner. The tunnel diode unbalanced pair "locks" in a stable condition which is determined by the input signals applied to the circuit when the clock voltage rises to +0.5 volt at $T_c$. Once the tunnel diode pair locks, the unbalanced pair is insensitive to changes in input signal conditions. Accordingly, the final conducting states of the first and second transistors 20, 30 are determined only by the input signal conditions which are present at $T_c$. If an input to the circuit is connected to the (0) output terminal of a like circuit, it may be seen that the input signal condition will not change until some time after $T_c$, due to the delay in the output voltage change of the previous circuit. In like manner, the (0) output terminal 44 of the FIGURE 1 circuit may be connected to an input of a like circuit in a succeeding stage. Since any voltage change at the output terminal 44 is delayed following the termination of a negative going clock pulse, the tunnel diode unbalanced pair in the succeeding stage will lock in a condition determined by the voltage at terminal 44 at $T_c$, and will be insensitive to any change in voltage at the output terminal 44 at $T_d$. Essentially, the delay between the switching of the tunnel diode 70 in the input circuit and any change in voltage at the output circuit may take the place of the interim storage or delay generally provided in many shifting type circuits. The actual delay, $T_c$ to $T_d$, may be about two to four nanoseconds, depending upon circuit loading. When the circuit is used in a shift register or like application, only one input diode, associated current means and tunnel rectifier are connected in the circuit.

Consider now the operation of the circuit when all of the input terminals 86, 88, 98 and 100 are at zero volts, and the clock voltage falls to ground potential. Both tunnel diodes 70 and 72 then are in the low voltage condition. When the clock voltage next rises to +0.5 volt, current flows from terminal 74 through tunnel diode 72. A portion of the diode 72 current flows through the other diode 70, and a portion of the current from diode 72 is diverted through the tunnel rectifiers 104 and 106 to the current means 90 and 102. Each of the latter current means takes four milliamperes of current. For this reason, the tunnel diode 72 current is eight milliamperes greater than the tunnel diode 70 current. Since diode 72 has a peak current which is only two milliamperes greater than the peak current of diode 70, diode 72 switches to the high voltage state and tunnel diode 70 remains in the low voltage state. The base 26 voltage is close to ground potential and first transistor 20 takes all of the current from the source 40.

It will be noted that the voltage at collector 24 is +0.5 volt when the base 26 voltage is close to ground potential and first transistor 20 is conducting. This means that the collector 24-base 26 junction is slightly forward biased. Because of the tunnel diode 28 characteristics, however, the collector 24 voltage never goes more positive than the base 26 voltage than about 0.5 volt. This small voltage differential is not enough to saturate the transistor 20 when the transistor is a high-speed silicon transistor. For like reasons, second transistor 30 does not saturate. Also, the time constants of the output circuitry are low due to the absence of collector resistors. Accordingly, very high speed operation is possible. The circuit has the further advantage that the output voltages vary between two well-defined levels without requiring saturated transistor operation.

Figure 5:
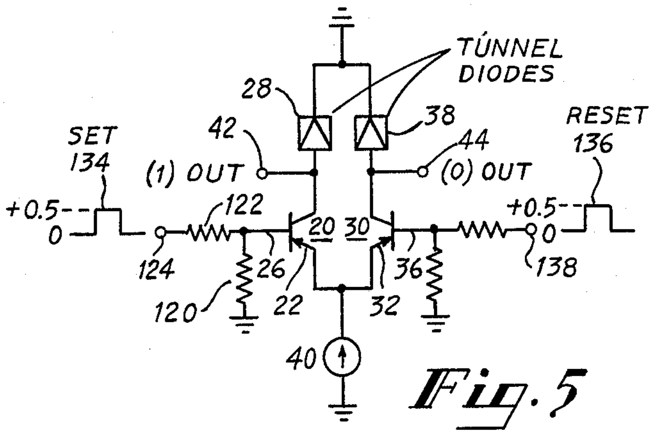
FIGURE 5 is a schematic diagram of a set-reset flip-flop.

FIGURE 5 is a schematic diagram of a set-reset flip-flop which embodies the novel current steering transistor pair of FIGURE 1. The input circuits at the base electrodes 26 and 36 differ from the input circuits in the FIGURE 1 arrangement. A resistor 120 is connected between base electrode 26 and ground, and a resistor 122 is connected between an input terminal 124 and the base 26. The base input circuit of second transistor 30 is similar to the input circuit at base electrode 26.

In FIGURE 5, the current I supplied by the source 40 has a value which is greater than the peak current of either of the tunnel diodes 28, 38 and less than the sum of the current peaks, assuming that the tunnel diodes have equal peak currents. If the peak currents are not equal, the current I is selected so that it has a value greater than the value of the largest peak current and so that the quantity $I/2$ is less than the smallest tunnel diode peak current.

Assume that a positive set pulse 134 is applied between input terminal 124 and ground. This pulse 134 turns off first transistor 20 while it is applied. The current I from source 40 then flows through second transistor 30 and switches tunnel diode 38 to the high voltage state. At the termination of the set pulse 134, both base electrodes 26 and 36 have the same voltage value, both transistors 20 and 30 conduct, and the current I ideally divides equally between the two transistors. Because of the choice of the value of I, however, the steady state current $I/2$ flowing through tunnel diode 28 is insufficient to switch this diode to the high voltage state. Tunnel diode 38, however, remains in the high voltage state, and the voltages at the output terminals 42 and 44 are zero and +0.5 volt, respectively.

The aforementioned condition persists until a positive reset pulse 136 is applied at the input terminal 138. This pulse turns second transistor 30 off. All of the current from source 40 then is steered through first transistor 20 to its tunnel diode 28, switching diode 28 to the high voltage state. Tunnel diode 38 switches back to the low voltage state when the second transistor 30 current is reduced close to zero. At the termination of the reset pulse 136, current from source 40 again divides equally between the first and second transistors 20 and 30, but does not change the operating states of the tunnel diodes 28 and 38. The output voltages at terminals 42 and 44 for this condition are +0.5 volt and zero, respectively.

Due to variations in transistor parameters, the current from source 40 may not divide equally between the transistors in the steady state condition. In that case, a current balancing arrangement of the type illustrated in FIGURE 6 may be employed. Resistors 140 and 142 are connected from the emitter electrodes 22 and 32, respectively, to be ungrounded terminal of the current source 40. These resistors 140 and 142 have equal values which are high enough to substantially swamp out the effects of differences between the transistors 20 and 30. A capacitor 144 may be connected between the emitter electrodes 22 and 32 to provide a low impedance path between emitters during switching transients.

The flip-flop circuit of FIGURE 5 is described in greater detail in a copending application of Michael Cooperman, Serial No. 332,497, filed concurrently herewith and assigned to the same assignee as the present application.

Figure 7:
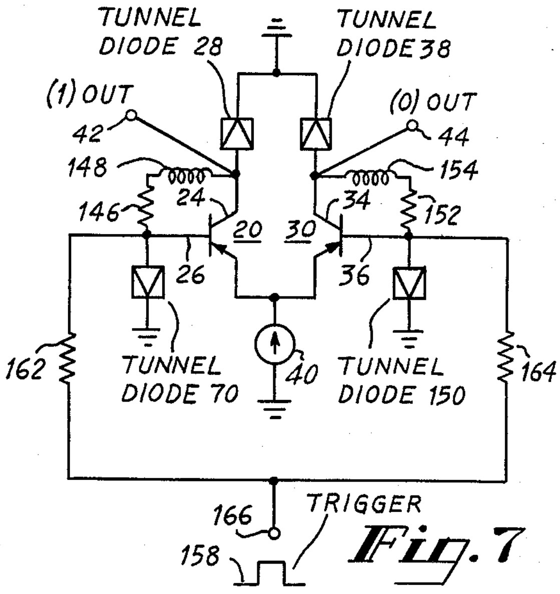
FIGURE 7 is a schematic diagram of a triggerable flip-flop according to the invention.

FIGURE 7 is a schematic diagram of a triggerable flip-flop according to the invention. The first and second transistors 20 and 30 and their emitter and collector circuitry are similar to that of the circuits already described and need not be discussed further. The input to the first transistor 20 includes a tunnel diode 70 connected between base electrode 26 and ground. The series combination of a resistor 146 and an inductor 148 is connected between the base electrode 26 and the collector electrode 24. Second transistor 30 has a tunnel diode 150 connected between base 36 and ground, and the series combination of a resistor 152 and an inductor 154 connected between base 36 and collector 34. Input trigger pulses 158 from a common source (not shown) are applied at the anodes of the tunnel diodes 70 and 150 by way of resistors 162 and 164.

Current source 40 supplies a current which is greater than the peak current of either of the tunnel diodes 28 and 38. As will be seen as the discussion proceeds, both of the transistors 20 and 30 conduct in the steady state condition, whereby it is necessary that the current I from source 40 be selected so that $I/2$ is less than the peak current of either diode 28, 38 (assuming that no current sinks are connected at the collector electrodes 24, 34).

In order to describe the operation of the circuit, let it be assumed that tunnel diode 28 is in the high voltage state and that tunnel diode 38 is in the low voltage state. Ideally, current from source 40 divides equally between the first and second transistors in the steady state condition. For purposes of explanation let it be assumed that each of the diodes 28 and 38 has a peak current of 15 milliamperes and that source 40 supplies a substantially constant current of 18 milliamperes. Neglecting base current, 9 milliamperes of current flow out of each collector electrode 24, 34. Input tunnel diodes 70 and 150 may be five milliampere peak diodes.

The voltage at collector electrode 24 is about +0.5 volt and the voltage at collector electrode 34 is zero volts because tunnel diodes 28 and 38 are in the high voltage and low voltage states, respectively. Current flows through the tunnel diode 70 because of the positive voltage applied at its anode through the feedback path. Resistor 146 is selected so that the tunnel diode 70 current is about 2.5 milliamperes when tunnel diode 28 is in the high voltage state. Little or no current flows through the tunnel diode 150, however, since the collector 34 voltage is at ground potential.

Figures 8, 9, 10, 11:
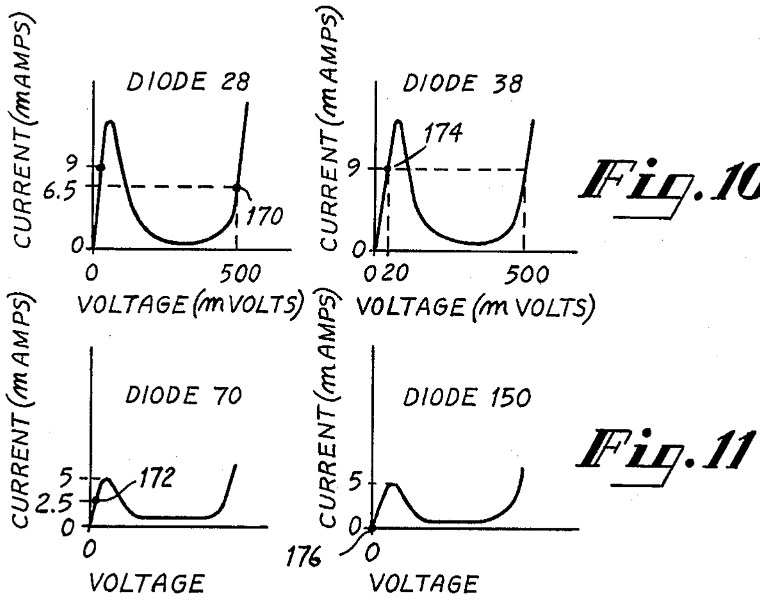
FIGURES 8 through 11 are tunnel diode operating characteristics useful in describing the operation of the triggerable flip-flop.

The operating conditions for the four tunnel diodes for the conditions given are illustrated in FIGURES 7 through 11. The nine milliamperes of collector current in first transistor 20 divides between tunnel diode 28 and tunnel diode 70, with 2.5 milliamperes following through tunnel diode 70 and the remaining 6.5 milliamperes following through tunnel diode 28. Tunnel diode 28 is biased at a point 170 in the high voltage region (FIGURE 8) and tunnel diode 70 is biased at the operating point 172 in the low voltage region (FIGURE 9). The nine milliamperes of collector current in second transistor 30 flow almost entirely through the tunnel diode 38, and diode 38 is biased at a point 174 in the low voltage region (FIGURE 10). Only a very small current flows through the tunnel diode 150. Accordingly, diode 150 is shown for convenience as being biased at the origin at a point 176 (FIGURE 11).

Consider now that a trigger pulse 158 is applied at the input terminal 166. The resistors 162 and 164 in the trigger input circuit may be selected in value so that three milliamperes of current are supplied to each of the tunnel diodes 70 and 150 when a trigger pulse 158 is applied. The three milliamperes supplied to diode 150 are insufficient to switch tunnel diode 150 from the low voltage state to the high voltage state. However, the additional three milliamperes of current supplied to diode 70, added to the 2.5 milliamperes of current already flowing through the diode, raise the diode 70 current to 5.5 milliamperes. This current is greater than the peak current of diode 70, whereby diode 70 switches to the high voltage state and raises the base 26 voltage of first transistor 20 to about +0.5 volt. First transistor 20 then turns off and all of the current from source 40 is steered through the second transistor 30, switching tunnel diode 38 to the high voltage state. The inductor 148 in the feedback path of first transistor 20 continues to supply a current of 2.5 milliamperes to tunnel diode 70 and maintains diode 70 in the high voltage state during the switching transient, even though the trigger pulse 158 may terminate during the transient period.

After the current flowing through first transistor 20 reduces to a low enough value, tunnel diode 28 switches back to the low voltage state and the voltage at the collector 24 falls to ground potential. Current through tunnel diode 70 then is reduced to zero and tunnel diode 70 switches back to the low voltage state. First transistor 20 then conducts again, and the source 40 current is steered equally to the first and second transistors.

Since tunnel diode 38 was triggered to the high voltage state, the collector 34 voltage is now +0.5 volt, and a portion of the collector 34 current is diverted to the tunnel diode 150. Resistor 152 is chosen in value so that the diode 150 current is about 2.5 milliamperes. Accordingly, the next applied trigger pulse 158 switches the tunnel diode 150 to the high voltage state. Second transistor 30 then turns off, tunnel diode 38 switches back to the low voltage state and the full source current 40 flowing through first transistor 20 during the transient period switches tunnel diode 28 to the high voltage state.

Figure 6:
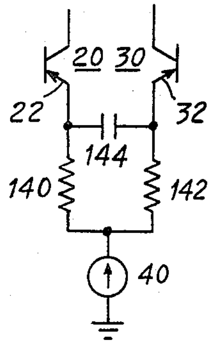
FIGURE 6 is a schematic diagram of a current balancing network that may be used in the circuit of FIGURE 5.

To guarantee that current from source 40 divides equally between the two transistors 20, 30 in the steady state condition, a current balancing network of the type illustrated in FIGURE 6 may be employed in the FIGURE 7 arrangement.

The FIGURE 7 circuit may form one stage of a counter of several like stages by capacitively coupling the input terminal 166 to the (0) output terminal of the next preceding stage.

As in the case of the circuits previously described, first and second transistors 20 and 30 may be high speed silicon devices. The voltage at the base electrode of a transistor is just slightly more positive than ground potential when the tunnel diode in its collector circuit is in the high voltage state and the collector voltage is about +0.5 volt. In this case, the collector-base junction of the transistor is forward biased, but the small collector-base voltage differential is always less than 500–600 millivolts, which is insufficient to saturate the transistor. Accordingly, the transistors 20, 30 do not suffer the slow turn-off and turn-on characteristic of transistor saturation, and the circuit may be triggered at very high speed.

The circuits of FIGURES 1, 5 and 7 have been illustrated, by way of example, as employing PNP transistors. It will be understood to those skilled in the art, however, that NPN transistors also may be used, provided that the connections to the various diodes are reversed, and provided further that the polarities of the various bias sources and input signals also are reversed.

What is claimed is:

1. The combination comprising:

a pair of amplifying devices each having input and output electrodes defining a current carrying path, and a control electrode;

a current source connected in circuit between a point of reference potential and the input electrode of each of said amplifying devices;

a pair of tunnel diodes, each tunnel diode being connected between the output electrode of a different amplifying device and said point of reference potential, each tunnel diode having a peak current which is less than the current supplied by said current source;

first and second bistable devices each being connected in circuit between the control electrode of a different amplifying device and said point of reference potential; and feedback means connected between the output electrode of each amplifying device and the control electrode of the same said amplifying device.

2. The combination comprising:

a pair of amplifying devices each having input and output electrode defining a current carrying path, and a control electrode;

constant current supply means connected in circuit between a point of reference potential and the input electrode of each of said amplifying devices;

a pair of tunnel diodes, each tunnel diode being connected between the output electrode of a different amplifying device and said point of reference potential, each tunnel diode having a peak current which is less than the current supplied by said current supply means;

first and second bistable devices each being connected in circuit between the control electrode of a different amplifying device and said point of reference potential;

feedback means connected between the output electrode of each amplifying device and the control electrode of the same said amplifying device; and input signal means common to both of said bistable devices for switching one of said devices.

3. The combination as claimed in claim 2, wherein said bistable devices are tunnel diodes.

4. The combination comprising:

a pair of transistors each having base, collector and emitter electrodes;

constant current means connected between a point of reference potential and a point common to the emitter electrode of each transistor;

a pair of tunnel diodes, each tunnel diode being connected between the collector electrode of a different transistor and said point of reference potential, each tunnel diode having a peak current which is less than the current supplied by said current means;

third and fourth tunnel diodes each being connected between said point of reference potential and the base electrode of a different transistor;

feed back means including a resistor connected between the collector electrode of each transistor and the base electrode of the same transistor, each resistor having a value to limit the steady state feedback current to a value less than the peak current of the associated one of said third and fourth tunnel diodes; and input signal means common to both of said third and fourth tunnel diodes for increasing the current through one of said third and fourth diodes above the peak current value thereof.

5. The combination comprising:

a pair of amplifying devices each having input and output electrodes defining a current carrying path, and a control electrode;

substantially constant current supply means connected in circuit between a point of reference potential and the input electrode of each of said amplifying devices;

a pair of tunnel diodes, each tunnel diode being connected in a circuit between the output electrode of a different amplifying device and said point of reference potential, each tunnel diode having a peak current which is less than the current supplied by said current supply means and greater than one-half the current supplied by said supply means;

first and second bistable devices each being connected in circuit between the control electrode of a different amplifying device and said point of reference potential; and feedback means connected between the output electrode of each amplifying device and the control electrode of the same said amplifying device.

6. The combination comprising:

a pair of amplifying devices each having input and output electrodes defining a current carrying path, and a control electrode;

substantially constant current supply means connected in circuit between a point of reference potential and the input electrode of each of said amplifying devices;

a pair of tunnel diodes, each tunnel diode being connected in a circuit between the output electrode of a different amplifying device and said point of reference potential, each tunnel diode having a peak current which is less than the current supplied by said current supply means and greater than one-half the current supplied by said current supply means;

first and second bistable devices each being connected in circuit between the control electrode of a different amplifying device and said point of reference potential;

feedback means connected between the output electrode of each amplifying device and the control electrode of the same said amplifying device; and input signal means common to both of said bistable devices for switching one of said devices.

7. The combination as claimed in claim 6, wherein the first and second bistable devices are third and fourth tunnel diodes, respectively, and wherein each of said pair of tunnel diodes is connected to pass the output current of the associated amplifying devices in the forward conducting direction of the tunnel diode, and wherein the third and fourth tunnel diodes are connected to pass current through the respective feedback means in the forward conducting directions of those tunnel diodes.

8. The combination comprising:

a pair of transistors each having base, collector and emitter electrodes;

substantially constant current means connected between a point of reference potential and a point common to the emitter electrode of each transistor;

a pair of tunnel diodes, each tunnel diode being connected between the collector electrode of a different transistor and said point of reference potential, each tunnel diode having a peak current which is less than the current supplied by said current means and greater than one-half the current supplied by said current means;

third and fourth tunnel diodes each being connected between said point of reference potential and the base electrode of a different transistor;

feedback means including a resistor connected between the collector electrode of each transistor and the base electrode of the same transistor, each resistor having a value to limit the steady state feedback current to a value less than the peak current of the associated one of said third and fourth tunnel diodes; and input signal means common to both of said third and fourth tunnel diodes for increasing the current through one of said third and fourth diodes above the peak current value thereof.

References Cited by the Examiner

UNITED STATES PATENTS

| | | | |
|---|---|---|---|
| 3,076,105 | 1/1963 | Robinson et al. | 307—88.5 |
| 3,102,209 | 8/1963 | Pressman | 307—88.5 |
| 3,144,565 | 8/1964 | Coffey | 307—88.5 |
| 3,150,273 | 9/1964 | Dym | 307—88.5 |
| 3,156,833 | 11/1964 | Cloud et al. | 307—88.5 |
| 3,161,781 | 12/1964 | Spiegel | 307—88.5 |

OTHER REFERENCES

Rymaszewski: High-Speed Logic Circuit, IBM Technical Disclosure Bulletin, vol. 4, No. 9, February 1962.

Turnbull: Transistor-Tunnel Diode Inverter, IBM Technical Disclosure Bulletin, vol. 4, No. 2, July 1961.

Lo: Transistor-Tunnel Diode Logic Circuit, RCA Technical Note No. 502, March 1962.

ARTHUR GAUSS, *Primary Examiner.*

I. C. EDELL, *Assistant Examiner.*